United States Patent [19]

Preisler et al.

[11] 4,391,714

[45] Jul. 5, 1983

[54] PROCESS FOR REMOVING MOLYBDENUM FROM AQUEOUS SALT SOLUTIONS

[75] Inventors: Eberhard Preisler, Erftstadt; Bernhard Hofmann, Hürth-Knapsack; Johannes Holzem, Hüth-Gleuel, all of Fed. Rep. of Germany

[73] Assignee: Hoechst Aktiengesellschaft, Fed. Rep. of Germany

[21] Appl. No.: 365,989

[22] Filed: Apr. 6, 1982

[30] Foreign Application Priority Data

Apr. 10, 1981 [DE] Fed. Rep. of Germany ....... 3114559

[51] Int. Cl.³ .............................................. C25G 1/00
[52] U.S. Cl. .................................. 210/670; 210/684; 210/688; 252/471; 204/96

[58] Field of Search .......................... 252/471; 204/96; 210/670, 688, 684

[56] References Cited

U.S. PATENT DOCUMENTS 4,222,897  9/1980  Rollmann ............................ 252/471
4,295,943  10/1981  Tomov et al. ........................ 204/96

Primary Examiner—R. L. Andrews
Attorney, Agent, or Firm—Connolly and Hutz

[57] ABSTRACT

The disclosure relates to a process for removing molybdenum from aqueous salt solutions by adsorbing it on manganese dioxide. To this end, the salt solution is contacted with a bed of manganese dioxide ($MnO_2$) precipitated electrolytically and transformed into granular material.

10 Claims, No Drawings

PROCESS FOR REMOVING MOLYBDENUM FROM AQUEOUS SALT SOLUTIONS

The present invention relates to a process for removing molybdenum from aqueous salt solutions, especially manganese salt solutions, by adsorption on manganese dioxide.

Salt solutions which are prepared by dissolving naturally occurring ores are frequently contaminated with molybdenum which in turn often affects the work up of these solutions.

Molybdenum has more specifically been found seriously to contaminate manganese salt solutions which are made from manganese ores for the purpose of producing manganese dioxide so that it is necessary for these solutions to be purified prior to processing them. This is more especially the case whenever these manganese salt solutions find use in the production of electrochemically precipitated manganese dioxide (often termed EMD=Electrochemical Manganese Dioxide, in the literature).

Special processes for removing molybdenum from such manganese salt solutions have not been disclosed heretofore. Customarily, the manganese salt solutions are freed from foreign metal contaminants by neutralization with the aid of manganese-II-oxide and alkali metal or alkaline earth metal hydroxides or carbonates (e.g. iron and aluminum and partially also nickel, copper, arsenic and antimony). In a second step, the solutions are treated with hydrogen sulfide or a water-soluble sulfate to effect the precipitation of residual heavy metals in sulfide form (DE-PS No. 2 057 939).

Molybdenum, however, cannot be removed to any significant extent from the solutions, in the manner just described. The art is also aware of analytical methods for testing sea water, wherein sea water samples are contacted with manganese dioxide, the metal ions inter alia of molybdenum being adsorbed on manganese dioxide. To this end, the sea water samples are admixed with a manganese sulfate solution and an excess of bromine water to effect the precipitation of most finely divided manganese dioxide, or the sea water samples are admixed with freshly precipitated manganese dioxide and, after adsorption, filtered. These analytical methods are however not of assistance in commercial processes.

While chemically precipitated manganese dioxide admittedly has a large specific surface area, the fact remains that it is very fine-particulate material which has no significant compressive strength. As a result, it can be used in very thin layers only which naturally permit just very minor flow through rates to be produced per unit cross-sectional area of bed (cf. Example 4 hereinafter).

Naturally occurring pyrolusite has considerably coarser particles and a considerably higher compressive strength, but it has practically no power for adsorbing molydenum. It is therefore highly desirable to have an easy-to-effect commercial process permitting aqueous salt solutions, especially manganese salt solutions, such as those which are used for making manganese dioxide, to be decontaminated and freed from molybdenum.

The present invention now unexpectedly provides such process, wherein the salt solutions are brought into contact with a bed of loosely aggregated manganese dioxide precipitated electrolytically and transformed into granular material. It is more especially advantageous to use $MnO_2$ consisting of particles with a size of 0.05 to 5.0 mm, preferably 0.5 to 2.0 mm.

It is also good practice to use salt solutions which have a pH-value of less than 4, preferably of 1 to 2.5.

Once the adsorptive power of manganese dioxide is found to have been exhausted, the bed is easy to regenerate by first removing the salt solution and then treating the bed with an aqueous alkaline solution, the molybdenum adsorbed being subsequently removed. It is more particularly good practice to use a sodium hydroxide solution which has the concentration necessary for the solution which is obtained after adjustment of the desorption equilibrium, to still contain at least 2 weight %, preferably at least 5 weight % free sodium hydroxide solution. The desorption equilibrium will normally be found to have been established within a period of 1 to 20 hours, often 5 to 10 hours. The process comprising adsorption and desorption should preferably be effected at temperatures within the range 20° to 95° C., more preferably 60° to 80° C.

In carrying out the present process, use should conveniently be made of column-shaped recipients which receive the manganese dioxide bed and are provided near their bottom portion with devices permitting the salt solution to be regularly introduced into the recipient and hence into the bed. Needless to say, agitator-provided thickeners can also be used as desorption means. In this case, the manganese dioxide should preferably consist of particles with a size of 0.05 to 0.2 mm.

The high compressive strength of the material used in accordance with this invention makes it possible for the adsorption columns to be packed with beds of material loosely aggregated up to a level of several meters, without the beds becoming impermeable to the salt solutions. As a result, it is possible for a high throughput rate of salt solution to be produced per unit time, for a given cross-sectional area, last but not least in view of the fact that electrolytically precipitated manganese dioxide does not unfavorably compare with chemically precipitated manganese dioxide, as regards adsorptive power.

A very wide variety of devices can be used in carrying out the present process. It has however been found particularly advantageous to use a device comprised of two cylindrical steel tanks either made up of stainless steel or provided with a corrosion-proof inside coating or lining. It is preferable for the tanks to present a ratio of height to diameter of about 1:1 inasmuch as beds too narrow and high oppose, for an identical quantity of aggregated material, a high resistance to the flow of material therethrough, which is undesirable. In the event of the bed height being too low and the cross-sectional area being correspondingly wide, the regular flow of solution therethrough may no longer be ensured, despite the use of devices which control the regular admission of the salt solution on to the bed.

Each of the two adsorber vessels which incidentally have beds of identical material placed therein is connected to the other by means of pipings and valves so that salt solution which is to be purified is forced to flow first through one of the two vessels and then through the next. Mounted between the two vessels is a valve permitting solution specimens to be taken therefrom. Once, after a certain operation period, analysis of the specimen indicates that the adsorptive power of the bed in the first vessel is exhausted, the vessel is switched off, and its bed regenerated. Next, this particular vessel is connected to serve as the second vessel until analysis of a specimen indicates once again that the bed of material in the initially second vessel is exhausted; in this case, the procedure just described is inversed, etc. The device just referred to is particularly useful for the treatment of salt solutions which present a relatively high concentration of salt and which have a relatively high density. In the event of dilute salt solutions being concerned, it is good practice to bring the manganese dioxide of this invention into contact with the salt solutions inside a thickener, the bed of material loosely aggregated therein being slowly agitated or otherwise moved mechanically, if desired.

On regenerating the bed of manganese dioxide with the use of an alkaline solution, molybdenum becomes detached from the manganese dioxide surface area, in the form of alkali metal molybdate. To this end, the salt solution is drained off, the bed is water-washed over a period necessary to have wash water practically free from salt, except for insignificant salt proportions. Next, the bed is brought into contact with the alkaline solution, which preferably is a sodium hydroxide solution with a concentration of at least 2 weight %.

To accelerate the adjustment of the desorption equilibrium, it is good practice to circulate the alkaline solution by pumping it through a by-pass line, if necessary or convenient. Next, the alkaline solution is drained off, the bed of manganese dioxide is water-washed and used again.

The following Examples illustrate the invention which is naturally not limited to the specific variants described therein. Comparative Example 4 is intended to demonstrate the technically adverse effects which are encountered upon the use of very fine particulate manganese dioxide, e.g. chemically precipitated manganese dioxide.

EXAMPLE 1

2 kg of electrolytically precipitated manganese dioxide consisting of particles with a size between 0.5 to 1 mm (apparent volume of bed: 1 liter) was placed in a glass tube 5 cm wide and 50 cm high. By means of a dosing pump, a 1.3 molar manganese sulfate solution was pumped from below into the bed of manganese dioxide. Above the bed, the solution ran off freely through an overflow. After adsorption phases a, b, c and d, respectively, the bed inside the glass tube was regenerated as follows: the manganese sulfate solution was drained off, the glass tube was flooded with water and the water was ultimately drained off after about 10 minutes. This procedure was repeated three times. Next, 4 l of a 10% sodium hydroxide solution travelling through a cycle line was pumped over 10 hours through the bed of manganese dioxide. Finally, the lye was drained off and the glass tube was water-flooded three times.

The results obtained are indicated in the following Table 1.

TABLE 1

| | a | b | c | d |
|---|---|---|---|---|
| pH-value of MnSO₄-solution | 0.5 | 2.0 | 2.1 | 2.0 |
| Temperature of MnSO₄-solution | 20° C. | 20° C. | 20° C. | 20° C. |
| Throughput rate (l/h) | 0.92 | 0.84 | 1.5 | 1.5 |
| Contact time (minutes) | 40 | 50 | 25 | 25 |
| Glass tube exhausted after n liters | 110 | 200 | 2600 | 1600 |
| Mo-content prior to adsorption (mg/l) | 100 | 55 | 4.5 | 5.5 |

TABLE 1-continued

| | a | b | c | d |
|---|---|---|---|---|
| sorption (mg/l) | | | | |
| Mo-content after adsorption (mg/l) | 6.6 | 5.0 | <0.25 | <0.1 |
| Degree of purity (%) | 94 | 91 | >95 | >98 |

EXAMPLE 2

The apparatus was the same as in Example 1, but placed therein was EMD consisting of particles with a size of 2 to 4 mm. The material treated was a manganese sulfate solution which had a pH-value of 2 and contained molybdenum at a rate of 4 g/l. The throughput rate was 1.5 l/h. After 25 l had been put through, the molybdenum adsorption was 95%, which dropped to 60% after a throughput of 100 l, and down to 50%, after a throughput of 200 l. Following regeneration, the corresponding values determined for the second adsorption cycle were 75, 55 and 40%, respectively.

EXAMPLE 3

250 kg of electrolytically precipitated manganese dioxide was placed in a rubber-lined steel vessel 60 cm wide and 100 cm high. The particle density was 4 kg/l and the apparent density 2 kg/l. This corresponded to a volume of 175 l equal to a filling level of 60 cm. The manganese salt solution which was to be purified was introduced into the manganese dioxide bed through an opening provided in the bottom portion of the vessel. The solution had a temperature of 70° C. It passed through the bed and then ran off from the vessel. Its pH-value was 2.5 (Table 1). By means of a cover, the apparatus which can optionally be steam-heated through a jacket, was made resistant to pressure.

After the adsorption capacity was found to have been exhausted, the manganese salt solution still present in the vessel was drained off and the vessel was flooded twice with water. Next, a 25% sodium hydroxide solution was introduced into the vessel and allowed to remain therein over a period of 16 hours. After that time, the sodium hydroxide solution was drained off, the vessel was flooded again twice with water, and the manganese dioxide was reused for adsorbing molybdenum thereon. In commercial operation, use is made of two such units as just described, which are arranged serially, i.e. with one downstream of the other, and can be regenerated alternately, once the bed in the unit upstream of the other is found to have been exhausted. The results indicated in the following Table 2 were obtained in tests made on just one bed.

TABLE 2

Electrolytically precipitated manganese dioxide consisting of particles with a size of 2 to 5 mm.
Filling quantity: 350 kg
Filling volume: 175 liters; empty volume of bed: 87 l
Throughput: 360 l/h ≅ 0.25 h contact time
Manganese concentration: 1.3 molar
pH-value of solution: 2.5
Molybdenum content of feed solution: 5 mg/l

| Initial adsorption | | | |
|---|---|---|---|
| Feed quantity | 0.5 m³ | 10 m³ | 20 m³ |
| Mo (mg/l) | | | |
| I | 0.2 | 0.7 | 2.6 |
| II | <0.1 | 0.1 | 0.5 |
| After 1st regeneration (with 5% NaOH) | | | |
| Feed quantity | 5 m³ | 15 m³ | |
| Mo (mg/l) | | | |
| I | 0.5 | 2.5 | |

TABLE 2-continued

| | | |  |
|---|---|---|---|
| II | 0.2 | 0.7 | |
| After 2nd regeneration (with 5% NaOH) | | | |
| Feed quantity | 5 m³ | 15 m³ | 25 m³ |
| Mo (mg/l) | | | |
| I | 0.7 | 2.5 | 3.7 |
| II | 0.1 | 0.7 | 2.0 |
| After 3rd regeneration (with 25% NaOH) | | | |
| Feed quantity | 5 m³ | 15 m³ | 25 m³ |
| Mo (mg/l) | | | |
| I | 0.3 | 1.2 | 1.4 |
| II | 0.1 | 0.2 | 0.7 |
| After 4th regeneration (with 25% NaOH) | | | |
| Feed quantity | 5 m³ | 15 m³ | 25 m³ |
| Mo (mg/l) | | | |
| I | 0.3 | 1.4 | 2.1 |
| II | 0.1 | 0.2 | 0.4 |

TABLE 3

Electrolytically precipitated manganese dioxide consisting of particles with a size of 0.5 to 2 mm

| | | | | | |
|---|---|---|---|---|---|
| Filling quantity: | 350 kg | | | | |
| Filling volume: | 180 liters | | | | |
| Empty volume: | 90 liters | | | | |
| Throughput: | 100 l/h ≅ 0.9 h contact time | | | | |
| Manganese concentration: | 1.3 molar | | | | |
| pH-value of solution: | 2.5 | | | | |
| Molybdenum content of feed solution: | 5 mg/l | | | | |
| Throughput volume: | 10 m³ | 30 m³ | 50 m³ | 70 m³ | 90 m³ |
| Mo mg/l | <0.1 | <0.1 | <0.1 | <0.1 | <0.2 |

EXAMPLE 4

Chemically precipitated pulverulent manganese dioxide with a particle size of ≦50 microns (resulting from manufacture) was placed in an adsorption column such as described in Example 1. The filling level was 9 cm only, corresponding to a volume of about 180 ml. A 1.3 molar manganese sulfate solution was introduced into the column, utilizing a pressure difference of 0.1 bar. The maximum throughput determined was 6 ml/h. Related to a bed of 1 liter of identical filling level and correspondingly enlarged cross-sectional area, the throughput rate would be 0.033 l/h. The comparable throughput rate in test 1 was more than 1.5 l/h.

The solution coming from the adsorption column contained less than 0.1 mg/liter molybdenum.

We claim:

1. In the process for removing molybdenum from aqueous salt solutions by adsorbing it on manganese dioxide, the improvement which comprises contacting the salt solution with a bed of manganese dioxide ($MnO_2$) precipitated electrolytically and transformed into granular material.

2. The process as claimed in claim 1, wherein the $MnO_2$ consists of particles with a size of 0.05 to 5 mm.

3. The process as claimed in claim 2, wherein the $MnO_2$ consists of particles with a size of 0.5 to 2 mm.

4. The process as claimed in claim 1, wherein the salt solution has a pH-value of less than 4.

5. The process as claimed in claim 4, wherein the salt solution has a pH-value of 1 to 2.5.

6. The process as claimed in claim 1, wherein the bed of $MnO_2$, once its adsorptive capacity is exhausted, is regenerated by draining off the salt solution and then treating the bed with an aqueous alkaline solution, the molybdenum adsorbed being ultimately removed.

7. The process as claimed in claim 6, wherein the bed is regenerated with the use of a sodium hydroxide solution which has the concentration necessary for the solution obtained after adjustment of the desorption equilibrium to still contain at least 2 weight % free sodium hydroxide solution.

8. The process as claimed in claim 7, wherein the solution still contains at least 5 weight % free sodium hydroxide solution.

9. The process as claimed in claim 1, carried out at temperatures of 20° to 95° C.

10. The process as claimed in claim 9, carried out at temperatures of 60° to 80° C.

* * * * *